United States Patent [19]
Iwata et al.

[11] Patent Number: 5,695,694
[45] Date of Patent: Dec. 9, 1997

[54] METHOD OF PRODUCING AN ACYLATED CELLULOSE FILM

[75] Inventors: Kaoru Iwata, Hachioji; Masanori Abe, Iwakuni; Utami Yonemura, Hino; Takeshi Sasaki, Hachioji, all of Japan

[73] Assignee: Teijin Limited, Osaka, Japan

[21] Appl. No.: 468,982

[22] Filed: Jun. 6, 1995

Related U.S. Application Data

[63] Continuation-in-part of Ser. No. 316,798, Oct. 3, 1994, abandoned.

[30] Foreign Application Priority Data

| Oct. 8, 1993 | [JP] | Japan | 5-253047 |
| Feb. 21, 1994 | [JP] | Japan | 6-22483 |
| Mar. 24, 1995 | [JP] | Japan | 7-066089 |

[51] Int. Cl.$^6$ ................................................ B29D 11/00
[52] U.S. Cl. .................... 264/1.34; 264/85; 264/217; 264/2.6; 359/73; 428/1; 524/108
[58] Field of Search .................. 264/85, 216, 217, 264/2.6, 1.34, 1.31; 359/73, 62; 428/1; 524/108

[56] References Cited

U.S. PATENT DOCUMENTS

| 2,319,051 | 5/1943 | Fordyee et al. | |
| 2,512,490 | 6/1950 | Drisch et al. | |
| 3,290,286 | 12/1966 | Kesting | 264/217 |
| 5,152,947 | 10/1992 | Takeda et al. | 264/217 |
| 5,478,518 | 12/1995 | Taketani et al. | 264/1.34 |

FOREIGN PATENT DOCUMENTS

| 774570 | 4/1933 | France. |
| 400589 | 11/1934 | United Kingdom. |
| 2013559 | 8/1979 | United Kingdom. |

*Primary Examiner*—Mathieu D. Vargot
*Attorney, Agent, or Firm*—Burgess, Ryan & Wayne

[57] ABSTRACT

An acylated cellulose film having a high optical isotropy and uniformity is produced by dissolving an acylated cellulose in a solvent substantially free from water and including, as a principal component, 1,3-dioxolane in a ratio in weight of the acylated cellulose to the solvent of 10/250 to 10/15; spreading the acylated cellulose solution on a film-forming surface of a support; and drying, for example, initially drying the spread solution layer on film-forming surface so as to reduce the content of the residual solvent in the resultant film to 5 to 30% by weight; removing the resultant residual solvent-containing film from the film-forming surface; and finally drying the removed film, while allowing the film to shrink in the transversal direction thereof, at a drying temperature controlled continuously or intermittently to a level satisfying the relationship (I): $(Tg'-50°\,C.) \leq T \leq (Tg'+20°\,C.)$ (I), wherein T is the drying temperature (°C.) and Tg' is a glass transition temperature (°C.) of the solvent-containing film, the temperature Tg' varying in response to the solvent content in the film.

21 Claims, 4 Drawing Sheets

METHOD OF PRODUCING AN ACYLATED CELLULOSE FILM

CROSS REFERENCE TO RELATED APPLICATION

This application is a continuation-in-part application of application Ser. No. 08/316,798, filed on Oct. 3, 1996, now abandoned.

BACKGROUND OF THE INVENTION

1. Field of the Invention

The present invention relates to a method of producing an acylated cellulose film. More particularly, the present invention relates to a method of producing an acylated cellulose film having a high surface property, transparency and uniformity in quality, by a film-casting method using a solvent comprising 1,3-dioxolane which is a halogen-free, non-environment-polluting solvent.

2. Description of Related Art

It is known that an acylated cellulose, for example, cellulose acetate, is useful for producing various films, for example, photographic base film and packing film. Recently, cellulose acetate film is practically utilized as a protecting film for a polarizing plate of a liquid crystal display device.

The properties of the cellulose acetate are quite variable depending on a degree of polymerization and a degree of acetylation thereof. Generally, the higher the degree of polymerization and the degree of acetylation, the higher the heat resistance, humidity resistance and dimensional stability, and the lower the processability and solubility.

Presently, it is believed that cellulose triacetate having a high molecular weight can be dissolved at a high concentration only in methylene chloride, and thus a cellulose triacetate film is practically produced from a cellulose triacetate solution in methylene chloride by a film-casting method. However, in consideration of the fact that methylene chloride is a carcinogen and an environment-polluting substance, the use of methylene chloride is now going to be prohibited. This disadvantage of methylene chloride is derived from the low boiling point of 40° C. resulting in the solvent being evaporated away during the film-production process which accelerates the pollution of the environment.

Further, the cellulose acetate films produced from a solution thereof in methylene chloride have excellent optical isotropy in directions parallel to the film surface plane. However, the cellulose acetate films exhibit an optical anisotropy in the direction of the thickness of the film. When a film having an optical anisotropy in the film thickness direction is used as a protecting film for a polarizing plate, and the polarizing plate with the protecting film is used for a liquid crystal display device, the resultant liquid crystal display device is disadvantageous in that when the display surface is visually observed in an inclined direction, the images on the display surface become difficult to clearly see.

Under the above-mentioned circumstances, a new solvent for acylated cellulose is strongly demanded to be developed.

SUMMARY OF THE INVENTION

An object of the present invention is to provide a method of producing an acylated cellulose film having excellent surface characteristics, transparency and optical isotropy, especially in the film thickness direction, and a low content of residual solvent, by using a halogen-free solvent.

The inventors of the present invention conducted extensive research to attain the above-mentioned object, and as a result it was discovered that 1,3-dioxolane is a good solvent for various acylated celluloses, and the resultant acylated cellulose solution in 1,3-dioxolane exhibits a high stability even at a high concentration thereof and thus an acylated cellulose film can be produced from the solution by a dry film-forming method. The present invention was completed based on this discovery.

Namely, the above-mentioned object can be attained by the method of the present invention for producing an acylated cellulose film, which comprises the steps of:

dissolving an acylated cellulose in a solvent substantially free from water and consisting essentially of 60 to 100% by weight of 1,3-dioxolane and 0 to 40% by weight of another solvent material in a ratio in weight of the acylated cellulose to the solvent of 10/250 to 10/15 to provide an acylated cellulose solution; spreading the acylated cellulose solution on a film-forming surface of a support; and drying the spread acylated cellulose solution layer to form a dried acylated cellulose film.

1,3-Dioxolane is a very good solvent for producing the acylated cellulose film. Only one slight disadvantage of 1,3-dioxolane is in that when brought into contact with air, 1,3-dioxolane is sometimes oxidized to produce a peroxide. As a result of energetic investigation of the inventors, it was found that the production of peroxide can be prevented by drying the acylated cellulose solution in an inert gas atmosphere. Surprisingly, it was found that even when 1,3-dioxolane is contained in a high concentration of 2.1% by volume, which is a lower limit concentration of explosion, or more in air, the acylated cellulose solution can be dried safely at a high efficiency. Namely, the acylated cellulose solution can be dried in an atmosphere containing 1,3-dioxolane by a simple operation and the solvent can be recovered at a high efficiency.

In an embodiment of the method of the present invention, the drying procedure is carried out in two or more steps in such a manner that in one or more initial stages, the spread acylated cellulose solution layer is dried on the film-forming support surface at a temperature of from 30° C. to 130° C. to an extent that the content of the residual solvent remaining in the resultant dried film is reduced to a level of 5 to 30% by weight, and then in a final stage, the initially dried film is removed from the film-forming surface of the support and further dried at a temperature of from 100° C. to 200° C. to an extent that the content of the residual solvent remaining in the resultant finally dried film is reduced to a level of 3% by weight or less.

Another embodiment of the method of the present invention for producing an acylated cellulose film, which comprises the steps of:

dissolving an acylated cellulose in a solvent substantially free from water and consisting essentially of 60 to 100% by weight of 1,3-dioxolane and 0 to 40% by weight of another solvent in a ratio in weight of the acylated cellulose to the solvent of 10/250 to 10/15, to provide an acylated cellulose solution;

spreading the acylated cellulose solution on a film-forming surface of a support;

initially drying the spread acylated cellulose solution layer on film-forming surface in at least one stage to an extent that the content of the residual solvent remaining in the resultant initially dried acylated cellulose film is reduced to a level of 5 to 30% by weight;

removing the resultant residual solvent-containing acylated cellulose film from the film-forming surface; and finally drying the removed solvent-containing acylated cellulose film in at least one stage, while allowing the film to shrink in the transversal direction thereof, at a drying temperature controlled continuously or intermittently to a level satisfying the relationship (I):

$$(Tg'-50°\ C.) \leq T \leq (Tg'+20°\ C.) \qquad (I)$$

wherein T represents the drying temperature in units of ° C., and Tg' represents a glass transition temperature in units of ° C. of the residual solvent-containing acylated cellulose film, the temperature Tg' being variable in response to the content of the residual solvent in the acylated cellulose film.

Also, the acylated cellulose film produced by the method of the present invention is included in the scope of the present invention.

The acylated cellulose film produced by the method of the present invention preferably has an optical isotropy represented by a value Q of 50 nm or less calculated in accordance with the equation (III):

$$Q=|(n_x+n_y)/2-n_z|\times d\times 10^3 \qquad (III)$$

wherein $n_x$ represents a refractive index in a slow axis direction of the film surface plane, $n_y$ represents a refractive index in the fast axis direction of a film surface plane, $n_z$ represents a refractive index in the thickness direction of the film, and d represents a thickness in units of μm of the film.

DESCRIPTION OF THE PREFERRED EMBODIMENTS

In the method of the present invention, an acylated cellulose is dissolved in a specific solvent to provide an acylated cellulose dope solution for producing an acylated cellulose film.

The acylated cellulose includes all the cellulose compounds produced by acylating entirely or partially hydroxyl groups of cellulose. The acyl groups of the acylated cellulose usable for the present invention are preferably selected from the group consisting of aliphatic acyl groups, for example, acetyl, propionyl and butyryl groups and cycloaliphatic acyl groups, for example, cyclohexanecarbonyl group, more preferably acetyl, propionyl and butyryl groups. Namely, the acylated cellulose usable for the present invention is preferably selected from the group consisting of cellulose acetate, cellulose propionate and cellulose butyrate, more preferably cellulose acetate. The acylated cellulose may have two or more acyl groups the same as or different from each other. The acylated cellulose may be used alone or in a mixture of thereof with another one or more acylated celluloses.

For the acylated cellulose usable for the present invention, the degree of acylation can be established in consideration of the use of the resultant film. Preferable acylated cellulose has a degree of acylation of 2.0 or more, more preferably 2.2 or more, per repeating D-glucopyranosyl unit thereof. If the degree of acylation is less than 2.0, the larger the proportion of hydroxyl groups, the lower the solubility of the acylated cellulose in the specific solvent of the present invention.

Particularly, a tri-acylated cellulose having a degree of acylation of 2.8 or more, especially cellulose triacetate having a degree of acetylation of 2.8 or more exhibits a low water-absorption and excellent mechanical properties, and thus is useful for forming photographic base film and protecting film of a polarizing plate of a liquid crystal display device. The number of hydroxyl groups of each repeating cellulose unit is 3 and thus a maximum degree of acylation for cellulose is 3.

The acylated cellulose usable for the method of the present invention preferably has a molecular weight corresponding to reduced viscosity (ηsp/c) of 0.3 to 10.0 dl/g, more preferably 0.5 to 8.0 dl/g, determined in a concentration of 0.5 g/dl in 1,3-dioxolane at a temperature of 25° C. If the intrinsic viscosity is more than 10.0 dl/g, the resultant acylated cellulose sometimes exhibits an unsatisfactory solubility in the specific solvent of the present invention. Even if the high viscosity acylated cellulose can be dissolved in the specific solvent, the resultant solution has a low concentration of acylated cellulose and a high viscosity and thus is not appropriate for the purpose of film formation.

The solvent usable for the preparation of the acylated cellulose dope solution contains substantially no water and consists essentially of 60 to 100% preferably 70 to 100%, by weight of 1,3-dioxolane and 0 to 40%, preferably 0 to 30%, by weight of another solvent in a mixing weight ratio of the acylated cellulose to the solvent of 10/250 to 10/15.

If the solvent contains a certain amount of water, it becomes difficult to obtain a dried cellulose film having an optically smooth surface thereof. Also, water exhibits a strong affinity for hydroxyl groups of cellulose and thus the interaction of water to the cellulose causes the drying of the spread cellulose solution layer to be difficult.

The solvent may consist of 1,3-dioxolane alone.

Another solvent material usable for the present invention and in a content of 40% by weight or less is selected in consideration of the use of the film and the properties of the desired dope solution and film, for example, dissolving property of the acylated cellulose, and chemical and physical stability of the resultant solvent. Namely, the type and amount of another solvent are established in consideration of the surface-improving (leveling) effect, the evaporation rate, the viscosity-controlling property and the crystallization-inhibiting effect thereof.

Another solvent preferably has a boiling point of from 40° C. to 160° C. and comprises at least one member selected from the group consisting of aromatic hydrocarbon compounds, for example, toluene and xylene; ketone compounds, for example, acetone, methylethylketone, and cyclohexanone; ester compounds for example, ethyl acetate and butyl acetate; ether compounds, for example, ethyleneglycol dimethylether, 1,4-dioxane, tetrahydrofuran and 1,2-dioxolane; aliphatic alcohols, for example, methyl alcohol, ethyl alcohol, and isopropyl alcohol; and halogenated hydrocarbon compounds, for example, methylene chloride and 1,2-dichloroethane.

In the acylated cellulose dope solution usable for the method of the present invention, the acylated cellulose is dissolved in an amount of 10 parts by weight in 15 to 250 parts by weight of the solvent. If the acylated cellulose/solvent mixing ratio is less than 10/250, namely, if the concentration of the acylated cellulose is less than 3.8% by weight, the resultant dope solution has too low a content of the acylated cellulose and sometimes too low a viscosity, and thus the amount of solvent to be removed in the drying step becomes too much and the film-production cost becomes too high. Also, where the dope solution is formed into a thin filmy layer by a spreading or extruding method, the low viscosity of the dope solution causes an external disturbance to occur on the surface of the dope solution layer, and thus the resultant film exhibits an unsatisfactory smoothness.

Also, if the mixing weight ratio of the acylated cellulose to the solvent is more than 10/15, the resultant dope solution exhibits an unsatisfactory fluidity and stability.

The concentration of the acylated cellulose is established in consideration of stability and viscosity of the resultant dope solution.

In the acylated cellulose dope solution, preferably the solvent is present in an amount of 20 to 250 parts, more preferably 20 to 120 parts, still more preferably 45 to 105 parts, by weight per 10 parts by weight of the acylated cellulose.

The dope solution optionally contains an additive, for example, a plasticizer.

The plasticizer may comprise at least one member selected from the class consisting of phosphoric acid esters, for example, triphenyl phosphate, tricresyl phosphate, triethyl phosphate, and biphenyldiphenyl phosphate; phthalic acid esters, for example, dimethoxyethyl phthalate, dimethyl phthalate and diethyl phthalate; glycolic acid esters (hydroxyacetic acid esters), for example, methylphthalylethyl glycolate and ethylphthalylethyl glycolate; trimellitic acid esters; toluenesulfonamides; and triacetin. Among the above-mentioned compounds, the plasticizers comprising at least one of the phosphoric acid esters are preferable for the acylated cellulose because of a high compatibility thereof with the acylated cellulose.

In the method of the present invention, the acylated cellulose dope solution is spread on a film-forming surface of a support, and the resultant filmy layer of the dope solution is dried by evaporating away the solvent, to produce a dry acylated cellulose film.

The film-forming steps can be conducted continuously, by three operations, namely, a dope solution-spreading (casting) operation, an initial drying operation and a final drying (heat-treatment) operation.

By the dope solution-spreading operation, the dope solution is evenly spread on a film-forming support surface to form a filmy dope solution layer.

By the initial drying operation, most of the solvent is evaporated away from the filmy dope solution layer on the film-forming support surface.

By the final drying (or heat-treating) operation, the residual solvent in the initially dried acylated cellulose film is removed.

The dope solution-spreading operation can be conducted by extruding the acylated cellulose dope solution onto the film-forming support surface through a slit die or by spreading the acylated cellulose dope solution on the film-forming support sheet by using a doctor blade or a reverse-roll coater.

Preferably, the acylated cellulose dope solution is continuously extruded through a slit die onto a smooth film-forming surface of a drum or a belt. The film-forming support is not limited to specific means, and can be selected from glass base plates, metal base plates, for example, a stainless steel plate and a ferrotype plate, and plastic base plates, for example, a polyethylene terephthalate plate. Usually, metal base plates having a mirror-finished surface are used to produce an acylated cellulose film having uniform surface characteristics at a high efficiency.

In the production of the acylated cellulose film having a desired transparency and surface-smoothness from the dope solution, a viscosity of the dope solution is an important parameter. The viscosity of the dope solution is variable depending on the type, concentration and molecular weight of the acylated cellulose and the type of the solvent. Preferably, the acylated cellulose dope solution usable for the method of the present invention has a viscosity of 500 to 200,000 mPa.s, more preferably 500 to 100,000 mPa.s, still more preferably 500 to 50,000 mPa.s at the spreading temperature. If the viscosity is higher than 200,000 mPa.s, the resultant dope solution sometimes exhibits a poor fluidity and thus it is difficult to produce a smooth film. Also, if the viscosity is lower than 500 mPa.s, sometimes, the resultant dope solution exhibits too high a fluidity and thus in the spreading step, an external disturbance is generated on the surface of the spread dope solution layer, and it becomes difficult to obtain a film having a smooth and uniform surface.

In the method of the present invention, the spreading step of the acylated cellulose dope solution is preferably carried out at a temperature of 10° to 70° C., more preferably 15° to 50° C. If the spreading temperature is higher than 70° C., sometimes, a foaming phenomenon occurs in the spread dope solution layer and thus the resultant film is unsatisfactory in the surface smoothness thereof. Also, if the spreading temperature is lower than 10° C., sometimes the spread dope solution layer is cooled so as to increase the viscosity thereof and to condense dew thereon, and the resultant film has unsatisfactory surface smoothness.

In the drying step of the method of the present invention, preferably most of the solvent is evaporated as fast as possible from the spread acylated cellulose solution layer on the film-forming support surface. However, if the evaporation is effected too fast, the resultant film is sometimes undesirably deformed. Therefore, the drying conditions should be carefully set forth.

In the method of the present invention, the drying procedure is preferably carried out at a temperature of from 30° C. to 200° C., more preferably from 40° C. to 180° C.

The drying procedure may be carried out in a single step or two or more steps. In the two or more step drying procedure, in one or more initial stages thereof, the spread acylated cellulose solution layer is preferably dried on the film-forming support surface.

In an embodiment, the drying operation on the film-forming support surface is carried out in the ambient air atmosphere. In another embodiment, the drying operation on the film-forming support surface is carried out in an atmosphere consisting essentially of an inert gas, for example, nitrogen gas, carbon dioxide gas and a mixture thereof, and 1,3-dioxolane gas, preferably in a content of 3% by volume or more.

The 1,3-dioxolane-containing atmosphere for the drying operation is effectively utilized to control the evaporation rate of 1,3-dioxolane from the spread dope solution layer, and the content of the residual solvent in the dried film.

Generally, the drying operation on the film-forming support surface is preferably carried out at a temperature of 30° C. to 130° C., more preferably 40° C. to 120° C., for a drying time of 5 to 60 minutes, more preferably 10 to 40 minutes, which is variable depending on the drying conditions and the moving speed of the film. In this operation, the drying temperature is preferably raised gradually and continuously to obtain a dried film having a high smoothness. To promote the drying rate, an air blast may be applied to the spread dope solution layer. The air blast preferably has a blast velocity of 1 to 20 m/sec., more preferably 2 to 15 m/sec. If the blast velocity is less than 1 m/sec., sometimes the drying-promotion effect is unsatisfactory, and if the velocity is more than 20 m/sec., sometimes, the surface of the spread dope solution layer is disturbed and thus the resultant dried film has an unsatisfactory smoothness. Preferably, in the initial stage of the drying operation, the air blast is applied at a low velocity, and then the blast velocity is gradually and continuously increased.

The drying operation on the film-forming support surface is preferably carried out to such an extent that the residual solvent in the dried film is in a content of 5 to 30% by weight, more preferably 10 to 20% by weight.

After this drying operation is completed, the resultant dried film is removed from the film-forming support surface.

If the content of the residual solvent is more than 20% by weight, the resultant film is too soft and is easily deformed due to flow of the polymer in the film when the film is peeled from the support surface. If the residual solvent content is less than 5% by weight, the dried film is firmly adhered to the support surface and thus the removal of the dried film is difficult.

The dried film removed from the support surface is preferably finally dried (or heat-treated) at a temperature of 100° C. to 200° C., more preferably 100° C. to 180° C., for a drying time of from 5 to 60 minutes, more preferably 10 to 30 minutes, to such an extent that the content of the residual solvent in the dried film is reduced to a level of 3% by weight or less, more preferably 1% by weight or less, still more preferably 0.5% by weight or less.

If the residual solvent content is more than 3%, the resultant dried film sometimes deforms with the lapse of time, or is dimensionally changed when it is further heated in succeeding processes. The final drying operation can be carried out while conveying the film by using a pin tenter or suspending roll dryer. In this final drying operation, an air blast may be introduced into the dryer. The final drying (heat-treatment) time is set forth in consideration of the drying conditions and the conveying velocity.

The dried film produced by the method of the present invention is not limited to ones having a specific thickness. Preferably, the dried film has a thickness of 5 to 500 μm, more preferably 10 to 300 μm.

In a preferable embodiment of the method of the present invention, the drying procedure is carried out in two or more steps in such a manner that in one or more initial stages, the spread acylated cellulose solution layer is dried on the film-forming support surface at a temperature of from 30° C. to 130° C., preferably 40° C. to 120° C. to such an extent that the content of the solvent remaining in the resultant first dried film is reduced to a level of 5 to 30% by weight, preferably 10 to 20% by weight, and then in a final stage, the initially dried film is removed from the film-forming surface of the support and finally dried at a temperature of from 100° C. to 200° C. preferably 100° C. to 180° C., to such an extent that the content of the residual solvent in the resultant finally dried film is reduced to a level of 3% by weight or less, preferably 1% by weight or less, more preferably 0.5% by weight or less.

In this preferred embodiment, the initial drying procedure on the film-forming support surface may be carried out in the ambient air atmosphere.

Alternatively, the initial drying procedure on the film-forming support surface may be carried out in an atmosphere consisting essentially of an inert gas and 1,3-dioxolane gas, preferably in a content of 3% by volume or more.

A method of producing an acrylate cellulose film in an inert gas atmosphere will be explained below.

In this method, the spread acylated cellulose solution layer is dried by removing the solvent in an inert gas atmosphere containing the solvent in a relatively high content.

The inert gas comprises at least one member selected from non-oxidative, incombustible gases, for example, nitrogen, argon, helium, and carbon dioxide gases, preferably nitrogen and carbon dioxide gases in an economical point of view.

In this drying procedure, the content of oxygen in the drying inert gas atmosphere is restricted to 10% by volume or less, preferably 8% by volume or less, more preferably 5% by volume or less. If the oxygen content is more than 10% by volume, the risk or explosion undesirably increases. The oxygen content has no lower limit as long as lower than the above-mentioned upper limit and can be established in consideration of economical effect.

In this method, the content of the solvent in the insert gas atmosphere is preferably 3% by volume or more, more preferably 5% by volume or more. Preferably, the content of the solvent in the insert gas atmosphere is 50% or less of the saturated concentration thereof at the drying temperature. If the solvent content is more than 50%, the drying rate of the spread acylated cellulose solution layer becomes too low.

During the drying procedure, the solvent containing 1,3-dioxolane, which is easily oxidized, can be recovered by introducing the solvent vapor generated in the drying procedure into a cooled condenser and liquefying the solvent vapor, substantially without oxidation of 1,3-dioxolane.

The drying procedure in the inert gas atmosphere can be carried out in the same manner as in the ambient air atmosphere. In this drying procedure, a dryer is connected to a supply source of an insert gas, for example, nitrogen gas, and a cool-condenser is connected to a gas outlet of the dryer. The cool-condenser is used to recover the solvent from the drying gas. A drying apparatus for this purpose is disclosed, for example, in Japanese Examined Patent Publication Nos. 55-36,389 and 59-21,656.

When the drying procedure is carried out in two or more steps, most of the solvent in the spread acrylated cellulose solution layer is removed in the initial drying step, therefore, the final drying step is not necessary to be carried out in the inert gas atmosphere. Namely, the final drying procedure (heat-treatment) may be carried out in the ambient air atmosphere. Even where the final drying procedure (heat-treatment) is carried out in an inert gas atmosphere, it is preferable that the content of the solvent in the drying atmosphere is as low as possible.

When the inert gas atmosphere is used as a drying atmosphere for the spread acylated cellulose solution layer, there is substantially no risk of explosion even when 1,3-dioxolane vapor is contained therein. Therefore, the drying procedure can be effected in the presence of the solvent vapor in a high concentration, and the solvent vapor can be easily recovered by a simple cool-condensing operation.

When the drying procedure is carried out in the inert gas atmosphere, the oxidation of the solvent does not occur and thus the production of a peroxide from 1,3-dioxolane can be prevented. Generally, it is believed that the lower the solvent content in the drying atmosphere, the higher the drying rate of the solvent. However, in this method, the drying procedure can be smoothly carried out at a high drying rate even in an inert gas atmosphere having a high solvent content. Therefore, the total drying time of the initial drying procedure in the inert gas atmosphere having a high solvent content and the final drying procedure (heat-treatment) is similar to that in the ambient air atmosphere having a low solvent content. The reason for this phenomenon is supposed that in the initial drying procedure in an inert gas atmosphere having a high solvent content, the surface drying of the spread acylated cellulose solution layer is suppressed so that no skin layer is formed in the surface portion of the solution layer, and therefore, the solvent can be smoothly diffused and removed from the solution layer in the successive drying procedure including the final procedure (heat-treatment).

The method of the present invention is useful for producing an acylated cellulose film having excellent surface property, transparency and uniformity in quality, and a significantly reduced content of the residual solvent, by utilizing 1,3-dioxolane as a solvent.

In an embodiment of the method of the present invention, the film-forming steps are conducted continuously, by a dope solution-spreading (casting) procedure, and a specific drying procedure.

By the dope solution-spreading procedure, the dope solution is evenly spread on a film-forming support surface in the same manner as mentioned above, to form a filmy dope solution layer.

By the drying operation, the solvent is evaporated away from the filmy dope solution layer on the film-forming support surface, to form a solid film.

In the embodiment of the present invention, the drying procedure comprises an initial drying procedure for the spread acylated cellulose solution layer on the film-forming surface in at least one step to an extent that the content of the residual solvent remaining in the resultant initially dried acylated cellulose film is reduced to a level of 5 to 30% by weight preferably 10 to 20% by weight; a removing procedure for the resultant residual solvent-containing acylated cellulose film from the film-forming surface; and a final drying procedure for the removed residual solvent-containing acylated cellulose film in at least one step, while allowing the film to shrink in the transversal direction thereof, at a drying temperature controlled continuously or intermittently to a level satisfying the relationship (I):

$$(Tg'-50° C.) \leq T \leq (Tg'+20° C.) \quad (I)$$

preferably the relationship (II):

$$(Tg'-20° C.) \leq T \leq Tg' \quad (II)$$

wherein T represents the drying temperature in units of ° C., and Tg' represents a glass transition temperature in units of ° C. of the residual solvent-containing acylated cellulose film, the temperature Tg' being variable in response to the content of the residual solvent in the acylated cellulose film.

The initial drying procedure may be carried out in a single continuous step or in two or more intermittent steps.

In the initial drying procedure, the acylated cellulose dope solution layer on the film-forming surface is continuously or intermittently dried preferably at a temperature of from 30° to 130° C., more preferably, 40 to 120° C. When the initial drying procedure is carried out continuously or intermittently at the temperature in the above-mentioned range, a dried film having a high smoothness can be obtained. To conduct the initial drying procedure with a high efficiency, a drying air may be blown. In this case, the blast is preferably applied to the spread dope solution layer at a blast velocity of 1 to 20 m/second, more preferably 2 to 15 m/sec. If the blast velocity is less than 1 m/sec, the drying-promotion effect of the air blast may not be satisfactory, and if the blast velocity is more than 20 m/sec, the spread dope solution layer may be disturbed and thus the resultant film may have an unsatisfactory smoothness. In the initial drying procedure, it is preferable that the blast velocity be restricted to a low level at an early stage or stages thereof and then, gradually increased continuously or intermittently in a later stage or stages.

During the initial drying procedure, the film is kept on the film-forming surface of the support. Then, the resultant initially dried acylated cellulose film is removed from the film-forming surface. The removed acylated cellulose contains the residual solvent in an amount of 5 to 30%, preferably 10 to 20% based on the total weight of the residual solvent-containing acylated cellulose film. If the content of the residual solvent in the film is more than 30% by weight, the resultant film is too soft and easily deformed due to flow of the polymer in the film when the film is peeled from the support surface. If the residual solvent content is less than 5% by weight, the dried film is firmly adhered to the support surface and thus the removal of the dried film results in undesirable strain (deformation) of the film.

The drying time is variable depending on the drying conditions, and usually is 5 to 60 minutes, preferably 10 to 40 minutes.

In the final drying (heat treatment) procedure, the film removed from the film-forming surface is further dried, while allowing the film to shrink in the transversal direction of the film, to reduce the content of the residual solvent in the film. Namely, the content of the residual solvent in the film is decreased to 3% by weight or less, preferably 1% by weight or less, still more preferably 0.5% by weight or less.

If the content of the residual solvent is more than 3% by weight, the resultant film undesirably deforms with the lapse of time, or is dimensionally changed when it is further heated in succeeding processes.

The final drying procedure can be carried out while conveying the film by using a pin tenter or suspending roll dryer. In this final drying procedure, an air blast may be introduced into the dryer.

The film-conveying speed is not limited to a specific level and preferably is in the range of from 0.5 to 25 m/min., more preferably 1 to 15 m/min.

In the final drying procedure, the drying temperature is controlled continuously or intermittently to a level satisfying the relationship (I):

$$(Tg'-50° C.) \leq T \leq (Tg'+20° C.) \quad (I)$$

wherein T represents the drying temperature in units of ° C., and Tg' represents a glass transition temperature in units of ° C. of the solvent-containing acylated cellulose film, the temperature Tg' varying in response to the content of the solvent in the acylated cellulose film.

If the shrinkage of the film in the transversal direction thereof is restricted during the drying procedure, in other words, the film is dried while maintaining the width of the film constant, an undesired tension (stress) in the transversal direction is produced in the film against the shrinking force created in the film due to the removal of the solvent. The transversal tension (stress) causes the molecular chains of the acylated cellulose in the film to be orientated in the transversal direction in the film surface plane. This orientation in the transversal direction causes the refractive index ($n_z$) of the film in the thickness direction thereof to decrease, so as to deteriorate the optical isotropy of the film. The orientation of the film in the directions involved in the surface plane of the film is promoted at a temperature higher than Tg' of the film, because, at a temperature higher than Tg' of the film, the movements of the molecular chains of the acylated cellulose are promoted. Accordingly, the final drying procedure must be effected without restricting the shrinkage of the film in the transversal direction, and the final drying temperature must be strictly controlled so as to satisfy the relationship (I).

Figure 1:
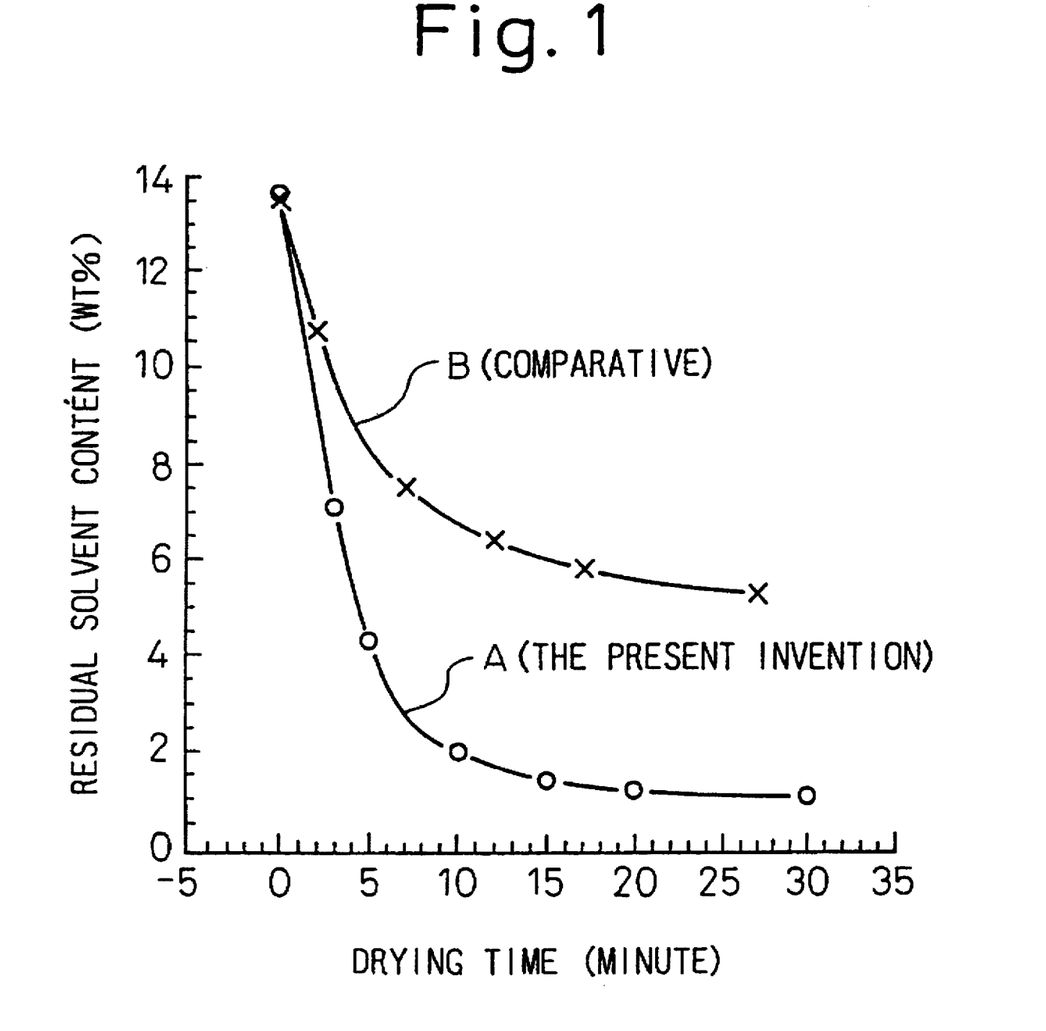
FIG. 1 is a graph showing a relationship between drying time and residual solvent content of an acylated cellulose film produced in Example 10 in accordance with the method of the present invention, in comparison with a comparative film.

The glass transition temperature Tg' of the acylated cellulose film varies greatly depending on the content of the residual solvent in the film. Namely, with an increase in the content of the residual solvent, the glass transition temperature Tg' significantly decreases as shown in FIG. 1, and the resultant film exhibits an enhanced deformability.

In view of the above-mentioned phenomena, the drying temperature T in the final drying procedure must be strictly controlled.

In the final drying procedure, with the progress of drying, the content of the residual solvent in the dried film decreases and the Tg' of the film increases.

To effectively dry the residual solvent-containing film while preventing a deformation or strain of the film, the drying temperature is raised in response to an increase in the Tg' of the film. If the drying temperature T is less than (Tg'−50° C.), the drying efficiency is unsatisfactory. Also, if the drying temperature T is more than (Tg'+20° C.), the film is easily deformed and the thickness and optical properties of the film become uneven, and thus the commercial value of the film decreases. Preferably, the drying temperature during the final drying procedure is controlled to a level satisfying the relationship (II):

$$(Tg'-20° C.) \leq T \leq Tg' \qquad (II)$$

During the final drying procedure, the drying temperature T may be continuously raised in a single step. Preferably, the drying temperature T is gradually raised intermittently in a plurality of steps, more preferably 4 to 7 steps.

The final drying procedure can be assisted by blowing air, in the same manner as in the initial drying procedure.

As mentioned above, the glass-transition temperature Tg' of the acylated cellulose film decreases with an increase in the content of the residual solvent. When stress, for example, a shrinking stress derived from a thermal deformation, is applied to an acylated cellulose film containing a residual solvent, the film is orientated in the same manner as that of the acylated cellulose film free from the solvent. The degree of orientation is, however, variable in response to the type and content of solvent. In the acylated cellulose film of the present invention containing a residual solvent consisting of, or comprising, as a principal component, 1,3-dioxolane, the degree of orientation derived from the thermal deformation thereof is very significantly lower than that containing methylene chloride, and thus the process of the present invention using 1,3-dioxolane is more advantageous in the production of an optical isotropic film than that using methylene chloride.

The acylated cellulose film produced by the process of the present invention preferably has an optical isotropy represented by a value Q of 50 nm or less calculated in accordance with the equation (III):

$$Q = |(n_x + n_y)/2 - n_z| \times d \times 10^3 \qquad (III)$$

wherein $n_x$ represents a refractive index in the slow axis direction of the film face, $n_y$ represents a refractive index in the fast axis direction of the film face, $n_z$ represents a refractive index in the thickness direction of the film, and d represents a thickness in units of μm of the film.

If the value Q is more than 50 nm, the resultant acylated cellulose film has an insufficient optical isotropy in the direction of thickness of the film. For example, when the acylated cellulose film having a Q value more than 50 nm is used as a protecting film for a polarizing plate of a liquid crystal display device, and images displayed on the display device are observed in an inclined direction, an ability of inspection of the images is unsatisfactory.

The refractive index ($n_x$) of the film in a slow axis direction thereof refers to the highest refractive index of the film in all the directions involved in the surface plane of the film, and the refractive index ($n_y$) of the film in a fast axis direction thereof refers to the lowest refractive index of the film in all the directions involved in the surface plane of the film.

There is no limitation to the thickness of the acylated cellulose film produced by the process of the present invention. Preferably, the thickness of the film is from 5 to 500 μm, more preferably 10 to 300 μm.

The film-producing process of the present invention may be carried out in the ambient air atmosphere or in an inert gas atmosphere, for example, nitrogen gas and/or carbon dioxide gas atmosphere. Particularly, from the view point of safety, the initial drying procedure is preferably carried out in the inert gas atmosphere, because during this procedure, most of the solvent, which is combustible, is evaporated away from the dope solution layer spread on the film-forming surface of the support.

The method of the present invention enables the acylated cellulose film having a satisfactory surface property, a high transparency and optical isotropy, especially in the direction of the film thickness and a low content of the residual solvent, to be produced from a dope solution of an acylated cellulose in a high concentration in a solvent consisting of or comprising, as a principal component, 1,3-dioxolane. The acylated cellulose film of the present invention is useful as a packing film, optical film, protecting film for polarizing plate and photographic base film. Particularly, where the acylated cellulose film is used to protect a polarizing plate of a liquid crystal display device, the resultant protecting film is colorless even when inspected in an inclined direction and images displayed on the display device can be inspected at a wide visual angle and thus the ability of inspection of the images can be enhanced.

EXAMPLES

The present invention will be further explained by the following specific examples which are merely representative and do not restrict the scope of the present invention in any way.

In the examples, the physical properties of the acylated cellulose film were determined by the following measurements.

(1) Light transmission and haze of the specimen were measured by using an ultraviolet and visible ray spectrometer (Trademark: UV-240, Manufacturer: Shimazu Seisakusho)

(2) Viscosity of the dope solution was measured at a temperature of 25° C. by using a B-type viscometer (Trademark: BH, Manufacturer: Tokyo Keiki K.K.).

(3) In Examples 1 to 13, retardation of the specimen was determined by measuring birefringence of the specimen with respect to visible light at a wavelength of 590 nm by using an automatic birefringence tester (Trademark: KOBRA-21AD, Manufacturer: Kanzaki Seishi K.K.).

The retardation, namely differential phase, was calculated from the equation:

$$Re = \Delta n \times d$$

wherein Re represents the retardation of the specimen, $\Delta n$ represents the birefringence of the specimen, and d represents a thickness of the specimen.

(4) In Examples 14 to 16, retardation (Re) value and birefringence ($\Delta n$) of the film specimen was determined by measuring birefringence of the specimen with respect to visible light at a wavelength of 590 nm by using an automatic birefringence tester (Trademark: M-150, Manufacturer: Nihon Bunko K.K.)

In the present invention, the retardation Re (nm) is represented by a production of the thickness (μm) of the film specimen with an absolute value of a difference in birefringence between the slow axis direction and the fast axis direction in the film specimen surface plane, namely $|n_x - n_y|$.

$$Re = |n_x - n_y| \times d$$

The measurement of the birefringence of the film specimen was carried out at 10 points of the film specimen spaced from each other in the longitudinal (conveying) direction (MD) thereof and at 10 points of the film specimen spaced from each other in the transversal direction (TD) thereof, and an average and a standard deviation of the measurement results were calculated.

(5) Amount of residual solvent in a film specimen was determined by measuring the weight of the film specimen before and after drying it at a temperature of 150° C. for 16 hours.

(6) Glass transition temperature of a film specimen was represented by a kick-off temperature of the film specimen measured by heating the film specimen by a DSC (Model: 2920 type, Manufacturer: TA Instrument Co.) at a temperature-raising rate of 20 ° C./min.

(7) Quantitative analysis of a peroxide derived from 1,3-dioxolane was carried out by $^1$H-NMR.

Example 1

A dope solution was prepared by dissolving 10 parts by weight of cellulose triacetate having a degree of acetylation of 2.83 per repeating unit thereof and reduced viscosity (ηsp/c) of 5.0 dl/g in 90 parts by weight of 1,3-dioxolane while stirring the mixture. The resultant dope solution had a concentration of cellulose triacetate of 10% by weight and was clear and viscous. The dope solution had a viscosity of $9.0 \times 10^3$ mPa.s at a temperature of 30° C.

It was confirmed that the dope solution was very stable for storage and no change in viscosity and no haze of the dope solution occurred even after being left to stand at room temperature for one week.

The dope solution was spread onto a horizontal glass plate surface by using a doctor blade, and the resultant dope solution filmy layer was dried on the glass plate surface at a temperature of 50° C. for 5 minutes, then at a temperature of 90° C. for 30 minutes, while blowing air at a speed of 2 m/sec. The initially dried film was removed from the glass plate. This film had a residual solvent content of 13% by weight. This film was finally dried at a temperature of 150° C. for 10 minutes under the same air-blowing conditions as above. A dried film having a thickness of 62 μm was obtained.

The dried film appeared clear and smooth and no roughened, surged and/or foamed surface portions were found. This film had a tensile strength of 10 kg/mm$^2$, an ultimate elongation of 32%, and an initial modulus of elasticity of 310 kg/mm$^2$, and thus appeared very tough.

Also, the resultant film exhibited a light transmission of 90% and a haze value of 0.6% in the visible ray band, and thus optically appeared transparent.

Further, the film exhibited a differential phase, namely retardation of 10 nm or less, and thus had a high isotropy.

Comparative Example 1

The same procedures for the preparation of the cellulose triacetate dope solution as in Example 1 were carried out, except that 1,3-dioxolane was replaced by one of 1,2-dichloroethane, acetone, ethyl acetate, tetrahydrofuran, acetonitrile, nitromethane and methylethyl ketone. In all cases, the resultant dope solutions were not homogeneous and could not be used for the production of films.

Example 2

A dope solution was prepared by dissolving 10 parts by weight of cellulose diacetate having a degree of acetylation of 2.4 per repeating unit thereof and reduced viscosity (ηsp/c) of 3.8 dl/g in 90 parts by weight of 1,3-dioxolane, while stirring the mixture. The resultant dope solution had a concentration of cellulose diacetate of 10% by weight and was clear and viscous. The dope solution had a viscosity of $5.1 \times 10^3$ mPa.s at a temperature of 30° C. It was confirmed that the dope solution was very stable for storage and no change in viscosity and no haze of the dope solution occurred even after being left to stand at room temperature for one week.

The dope solution was spread onto a horizontal glass plate surface by using a doctor blade, and the resultant dope solution layer was dried on the glass plate surface at a temperature of 50° C. for 5 minutes, then at a temperature of 90° C. for 30 minutes, and finally at a temperature of 150° C. for 10 minutes, while blowing air at a speed of 2 m/second. A dried film having a thickness of 56 μm was obtained.

The dried film appeared clear and smooth and had no roughened, waved and/or foamed portions. This film had a tensile strength of 7.9 kg/mm$^2$, an ultimate elongation of 28% and appeared very tough.

Also, this film exhibited a light transmission of 91% and a haze value of 0.6% in the visible ray band.

Further, the film exhibited a differential phase, namely retardation, of 10 nm or less, and thus had a high isotropy.

Examples 3 to 9

In each of Examples 3 to 9, a dope solution was prepared by the same procedures as in Example 1, except that 1,3-dioxolane was replaced by a mixed solvent consisting of 80% by weight of 1,3-dioxolane and 20% by weight of the compound indicated in Table 1.

It was confirmed that the cellulose triacetate was completely and uniformly dissolved in the mixed solvent, and the resultant dope solution is very stable for storage, as indicated in Table 1.

The dope solution was spread and dried by the same procedures as in Example 1 to produce a dried cellulose triacetate film. The resultant dried film appeared clear, smooth and uniform, and had no roughened, surged and/or foamed portions. Also, the film had a high transparency and isotropy. The test results are shown in Table 2.

TABLE 1

| Item | Mixed solvent material | | Concentration | Dope solution | |
|---|---|---|---|---|---|
| Ex. No. | Type | Amount (wt %) | of polymer (wt %) | viscosity (mPa · s) | Storage stability |
| 3 | Dioxane | 20 | 10 | $1.2 \times 10^4$ | good(*)$_1$ |
| 4 | Methylene chloride | 20 | 10 | $1.0 \times 10^4$ | good(*)$_1$ |
| 5 | 1,2-Dichloro-ethane | 20 | 10 | $1.2 \times 10^4$ | good(*)$_1$ |
| 6 | Acetone | 20 | 10 | $7.0 \times 10^3$ | good(*)$_1$ |
| 7 | Tetrahydro-furan | 20 | 10 | $8.5 \times 10^3$ | good(*)$_1$ |
| 8 | Ethyl acetate | 20 | 10 | $9.3 \times 10^3$ | good(*)$_1$ |
| 9 | Cyclohexanone | 20 | 10 | $1.2 \times 10^4$ | good(*)$_1$ |

Note:
(*)$_1$: After leaving to stand at room temperature for 3 days, the viscosity and appearance (transparency) of the dope solution did not change.

The same cellulose triacetate solution in 1,3-dioxolane solvent as in Example 1 was converted to a dried film by the same procedures as in Example 1, except that the resultant dried film had a residual solvent content of 15% by weight and a thickness of 80 μm.

For comparison, the same procedures as those mentioned above were carried out except that 1,3-dioxolane was replaced by dioxane and the resultant dried film had a residual solvent content of about 15% by weight and a thickness of 82 μm.

These films were subjected to a drying test at a temperature of 120° C. under no blast condition.

In FIG. 1, curve A shows a relationship between drying time and residual solvent content of the film produced by the method of the present invention, in comparison with curve B showing the comparative film.

FIG. 1 clearly shows that the 1,3-dioxolane can be removed from the cellulose triacetate film at a significantly higher removal rate than that of dioxane. Namely, by using 1,3-dioxolane as a solvent for acylated cellulose, a dried film having a low residual solvent content can be easily produced.

Example 11

A dope solution was prepared by the same procedures as in Example 1, except that the cellulose triacetate was replaced by a cellulose propionate having 2.85 propionate

TABLE 2

| Item | Drying conditions | Dried film | | | | |
|---|---|---|---|---|---|---|
| Ex. No. | (temperature (°C.) × Time (min)) | Appearance | | Thickness (μm) | Transmission (%) | Haze (%) | Retardation (nm) |
| | | Transparency | Smoothness | | | | |
| 3 | (50 × 10) → (90 × 30) → (130 × 15) | good | good | 61 | 91 | 0.8 | <10 |
| 4 | (40 × 5) → (60 × 10) → (90 × 10) → (130 × 5) | good | good | 60 | 90 | 1.0 | <10 |
| 5 | (50 × 10) → (60 × 10) → (90 × 20) → (130 × 10) | good | good | 56 | 91 | 0.7 | <10 |
| 6 | (50 × 10) → (70 × 10) → (90 × 30) → (130 × 10) | good | good | 52 | 91 | 1.0 | <10 |
| 7 | (50 × 10) → (70 × 10) → (90 × 30) → (130 × 10) | good | good | 48 | 91 | 0.9 | <10 |
| 8 | (50 × 10) → (70 × 10) → (90 × 30) → (130 × 10) | good | good | 52 | 90 | 0.9 | <10 |
| 9 | (50 × 10) → (70 × 10) → (90 × 60) → (150 × 10) | good | good | 63 | 91 | 0.7 | <10 |

Example 10

In this example, the content of residual solvent of a dried film produced from a cellulose triacetate dope solution in 1,3-dioxolane solvent was compared with that produced from a cellulose triacetate solution in dioxane solvent which is known as a solvent having a relatively high solubility for cellulose triacetate.

groups per repeating unit thereof and a reduced viscosity (ηsp/c) of 2.9 dl/g, and the resultant solution had a cellulose propionate concentration of 15% by weight. This dope solution exhibited a high stability for storage at room temperature. The dope solution was converted to a dried film by the same procedures as in Example 1.

The resultant film had a high transmission of 91%, a low haze value of 1.0% and a low retardation (differential phase) of not exceeding 10 nm. Namely, the resultant film was clear, isotropic and tough.

Example 12

A dope solution was prepared by the same procedures as in Example 1, except that the cellulose triacetate was replaced by a cellulose butyrate having 2.82 butyrate groups per repeating unit thereof and a reduced viscosity ($\eta$sp/c) of 3.2 dl/g, and the resultant solution had a cellulose propionate concentration of 15% by weight. This dope solution exhibited a high stability for storage at room temperature. The dope solution was converted to a dried film by the same procedures as in Example 1.

The resultant film had a high transmission of 91%, a low haze value of 0.8% and a low retardation (differential phase) of not exceeding 10 nm. Namely, the resultant film was clear, isotropic and tough.

Example 13

The Same cellulose triacetate solution in 1,3-dioxolane as in Example 1 was spread on a horizontal glass plate surface. The spread cellulose triacetate solution layer was dried in a nitrogen gas atmosphere containing 10% by volume of 1,3-dioxolane vapor at a temperature of 50° C. for 30 minutes and then at a temperature of 90° C. for 15 minutes. The resultant dried film was removed from the glass plate. This film contained 15% by weight of 1,3-dioxolane.

The drying curve of the resultant film was measured in the ambient air atmosphere at a temperature of 120° C. under no blast condition. The result is shown by curve C in FIG. 2.

The same test was carried out for a cellulose triacetate film produced by the same procedures as mentioned above, except that the drying atmosphere was the ambient air atmosphere containing substantially no 1,3-dioxolane, and 1,3-dioxolane content of the film was 13.5% by weight. The drying curve of this film was shown by curve D in FIG. 2.

Figure 2:
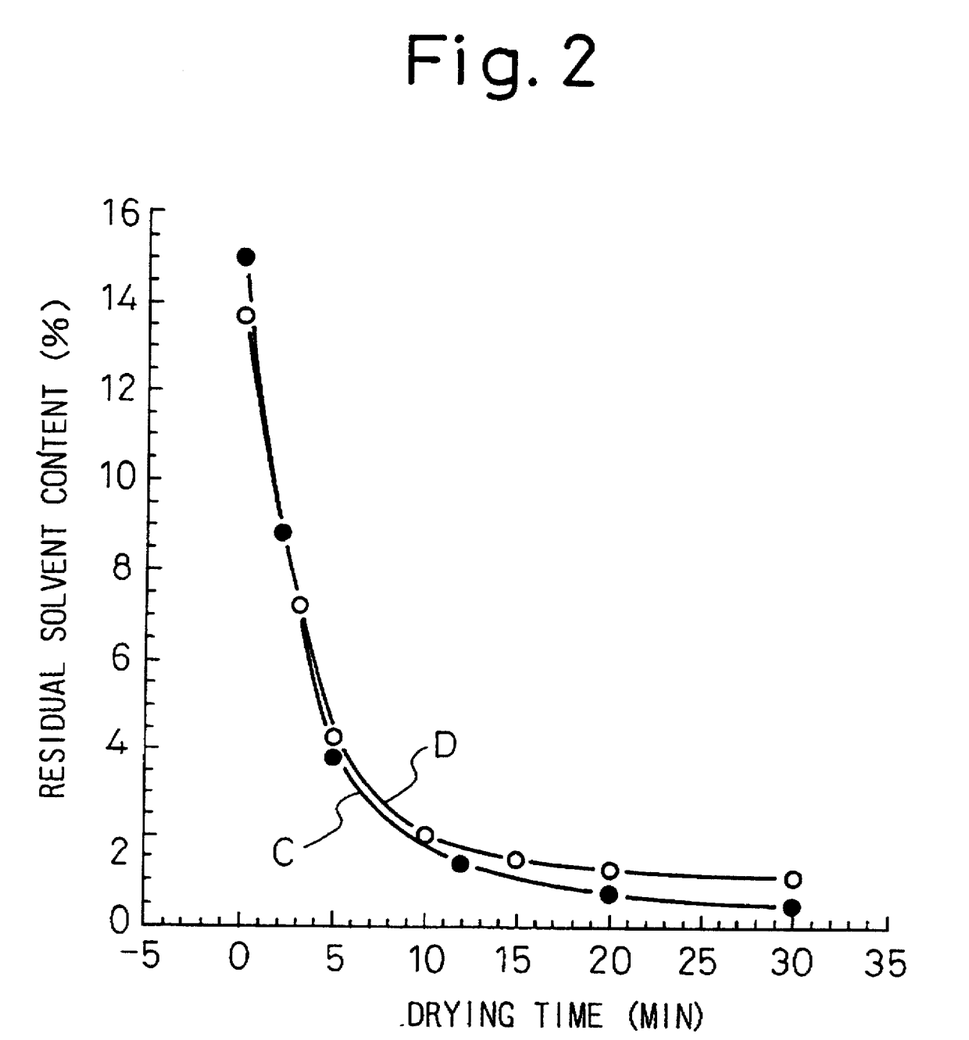
FIG. 2 is a graph showing a relationship between drying time and residual solvent content of two cellulose triacetate films produced in Example 13 in accordance with the method of the present invention.

In comparison of curve C with curve D, the residual 1,3-dioxolane content in the film dried in the 1,3-dioxolane vapor-containing nitrogen gas at a temperature of 120° C. for 30 minutes was smaller than that of the film dried in the 1,3-dioxolane-free air atmosphere under the same condition as mentioned above. This phenomenon is due to the fact that in the initial stage of the drying procedure in the 1,3-dioxolane vapor-containing atmosphere, the evaporation of the solvent on the surface of the spread cellulose triacetate solution layer was suppressed and no-skin was formed on the surface of the spread solution layer, and thus the solvent in the solution layer could be easily diffused and smoothly evaporated from the solution layer at a high efficiency.

The film dried in the 1,3-dioxolane-containing nitrogen gas atmosphere had a smooth surface and no roughened, surged and foamed portions were formed on the surface. This film had a tensile strength of 11 kg/mm$^2$, an ultimate elongation of 35% and an initial modulus of elasticity of 320 kg/mm$^2$, and appeared tough. Also, this film had a transmittance of 91% and a haze value of 0.5% for visible rays and appeared optically transparent. Further, this film had a differential phase (retardation) of 10 nm or less at a wave length of 590 nm and appeared very isotropic and a residual solvent content of 0.5% by weight.

The 1,3-dioxolane contained in the drying nitrogen gas in the dryer was collected by cooling the drying gas to a temperature of −70° C. A content of peroxide in the collected 1,3-dioxolane was measured by a quantitative analysis. As a result, the collected 1,3-dioxolane contained 104 ppm of a peroxide which is quite similar to that of the original 1,3-dioxolane of 100 ppm. Therefore, it was confirmed that during the cellulose film production, substantially no peroxide was generated.

Referential Examples 1 to 4

In the Referential Example 1, a dope solution was prepared by dissolving 15 parts by weight of cellulose triacetate having a degree of acetylation of 2.85 per repeating unit thereof and reduced viscosity ($\eta$sp/c) of 3.7 dl/g in 85 parts by weight of 1,3-dioxolane while stirring the mixture.

Figure 3:
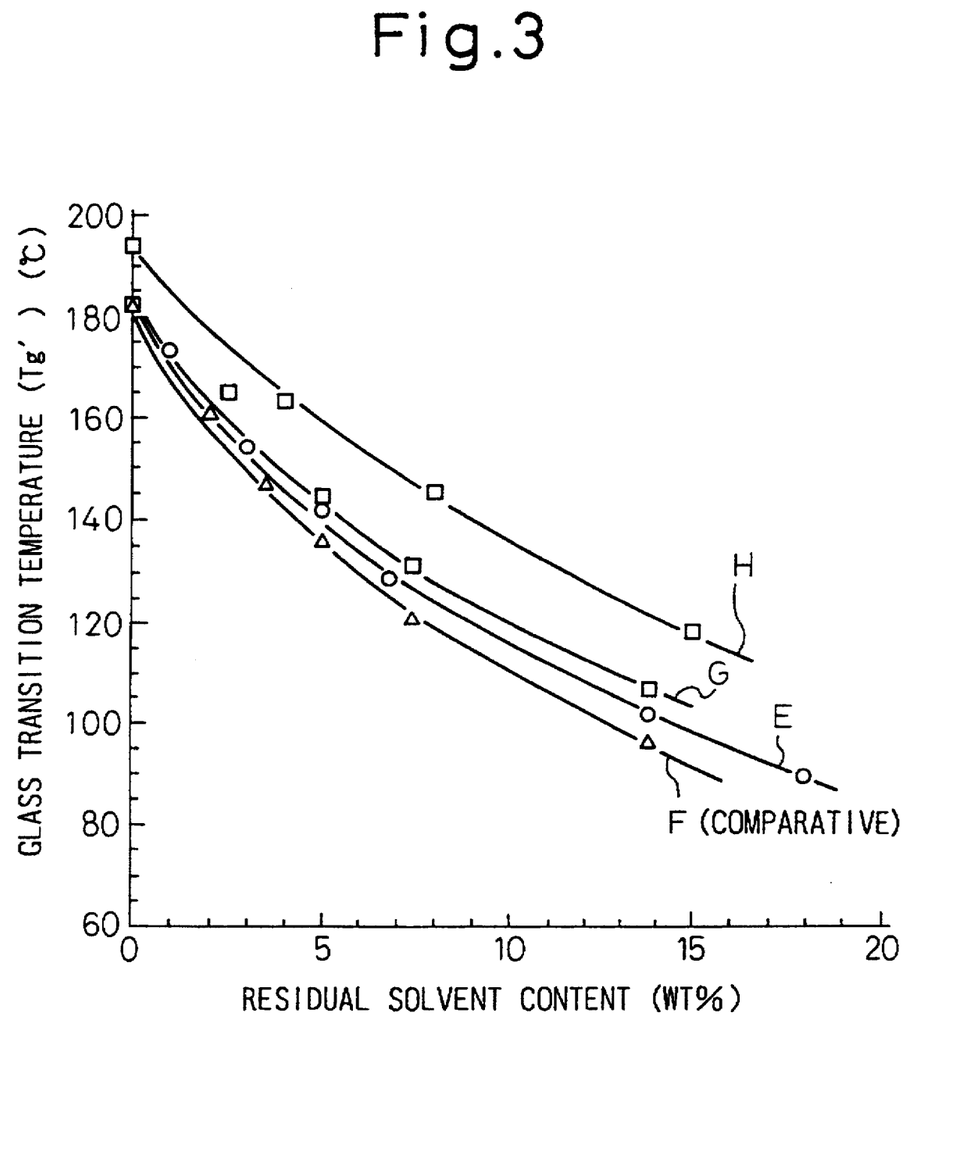
FIG. 3 is a graph showing a relationship between glass transition temperatures (Tg') and residual solvent contents of the films produced in Referential Examples 1 to 4.

The dope solution was converted to a plurality of films having a thickness of 100 μm and different in content of residual solvent from each other, by varying the drying conditions. The resultant films were subjected to the measurement of glass transition temperature (Tg'). The relationship between the residual solvent content and the glass transition temperature of the films is shown in FIG. 3, as curve E.

In Referential Example 2, (Comparative), the same procedures as in Referential Example 1 were carried out except that the solvent consisted of methylene chloride. The test results are shown as curve F in FIG. 3.

In Referential Example 3, the same procedures as in Referential Example 1 were carried out except that the solvent consisted of a mixture of 1,3-dioxolane with acetone in a mixing weight ratio of 80:20. The test results are shown as curve G in FIG. 3.

In Referential Example 4, the same procedures as in Referential Example 1 were carried out except that the dope solution was prepared by dissolving 15 parts by weight of cellulose diacetate having a degree of acetylation of 2.40 per repeating unit thereof and a reduced viscosity ($\eta$sp/c) of 3.8 dl/g in 85 parts by weight of a solvent consisting of 1,3-dioxolane. The test results are shown as curve H in FIG. 3.

FIG. 3 clearly shows that in all the films of Referential Examples 1 to 4, the Tg' significantly decreases with an increase in the residual solvent content.

Referential Example 5

A dope solution was prepared by dissolving 15 parts by weight of cellulose triacetate having an average degree of acetylation of 2.85 per repeating unit thereof and a reduced viscosity ($\eta$sp/c) of 3.7 dl/g and 1.5 parts by weight of tricresyl phosphate in 85 parts by weight of 1,3-dioxolane while stirring the mixture.

The dope solution was converted to a plurality of films having a thickness of 100 μm and different in content of residual solvent from each other, by varying the drying conditions. The resultant films were subjected to measurements of the glass transition temperature (Tg') and the residual solvent content. The relationship between the measured glass transition temperature and the residual solvent content of the film is shown by curve J in FIG. 4.

Figure 4:
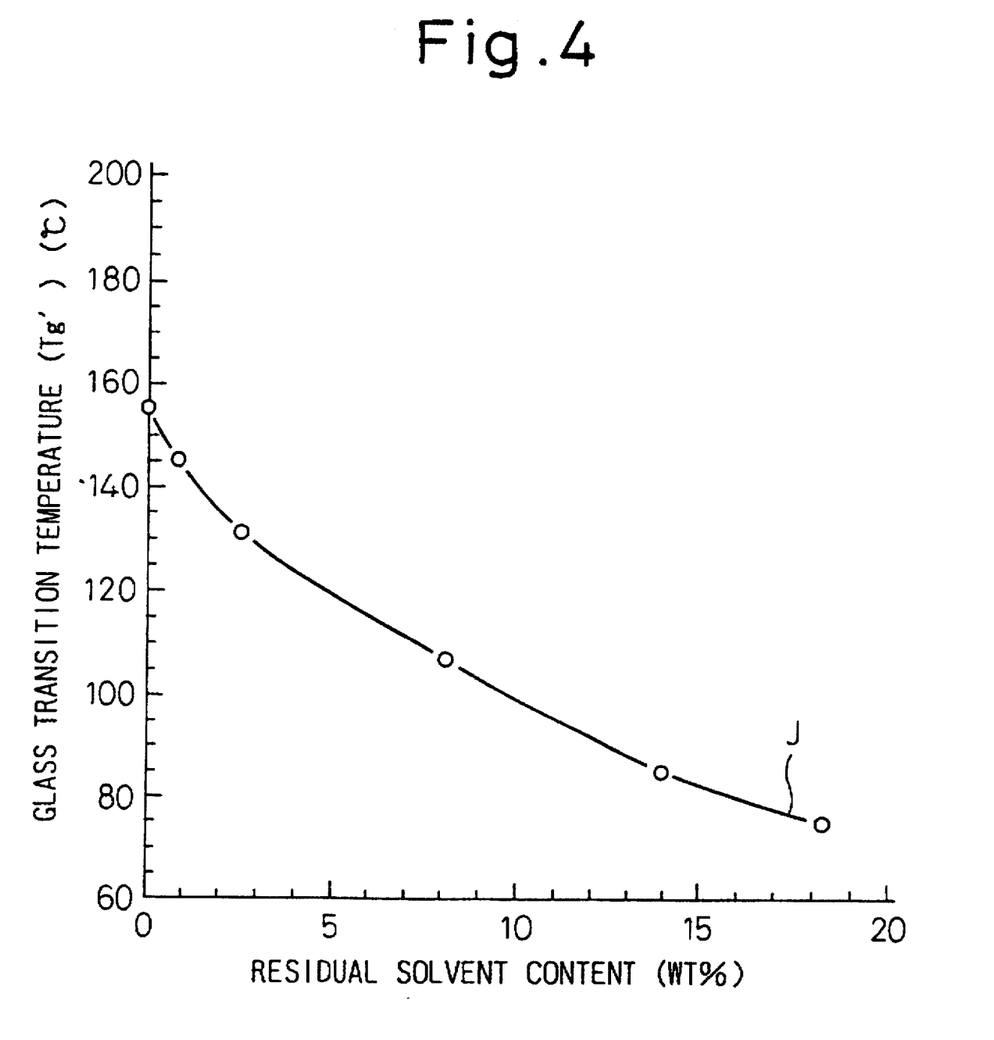
FIG. 4 is a graph showing a relationship between glass transition temperature (Tg') and residual solvent content of the film produced in Referential Example 5.

FIG. 4 clearly shows that the Tg' of the film significantly decreases with an increase in the residual solvent content.

Example 14

The dope solution of Referential Example 1 containing 15% by weight of cellulose triacetate dissolved in 1,3-dioxolane was subjected to a continuous film-forming process as follows.

In a casting (film-forming) apparatus, the dope solution was extruded onto and spread on a film-forming surface of an endlessly belt circulating through an initially drying oven having four sections different in temperature from each other. The drying temperatures in the four sections were 70° C., 80° C., 90° C. and 70° C. (cooling). Namely, in the initial three sections, the drying temperature was successively raised to 70° C., 80° C. and then 90° C. and in the final section, the initially dried film was cooled to a temperature of 70° C. The resultant initially dried film contained a residual 1,3-dioxolane in a content of 14.5% by weight. The film was removed from the belt surface and then subjected to a final drying procedure using a pin tenter having 6 drying sections in which the drying temperature was controlled in response to the Tg' of the residual solvent-containing film as follows.

| Drying section | Tg' (°C.) | Residual solvent (wt %) | Drying temperature (°C.) |
| --- | --- | --- | --- |
| No. 1 | 100 | 14.3 | 100 |
| No. 2 | 118 | 9.5 | 120 |
| No. 3 | 145 | 4.5 | 140 |
| No. 4 | 165 | 2.0 | 150 |
| No. 5 | 175 | 1.0 | 160 |
| No. 6 | — | — | 40 |

In the section Nos. 1 to 5, the drying temperature was successively raised in response to the measured values of Tg' and residual solvent content, in accordance with the relationship (I), and in section No. 6, the dried film was cooled.

The resultant cooled film had a residual solvent content of 0.1% by weight, a thickness of 75.0±0.6 μm, a transmission of 91% and a Re value of 7.0±0.5 nm. Namely, it was confirmed that the resultant film was uniform in qualities (optical properties, thickness, etc.) thereof, and exhibited a very low anisotropy.

Also, the Q value $(Q=|(n_x+n_y)/2-n_z|\times d\times 10^3)$ of the film was 35.0±1.2 nm.

Comparative Example 2

The same procedures for continuously producing a cellulose triacetate film as in Example 14 were carried out with the following exceptions.

As a dope solution, the cellulose triacetate dope solution prepared in Referential Example 2 and containing 15% by weight of cellulose triacetate dissolved in methylene chloride was used.

In the initial drying procedures, the drying temperature in the initial three sections was successively controlled to 40° C., 60° C. and 80° C., and in the final section, the initially dried film was cooled to a temperature of 40° C. The resultant initially dried film contained 12.5% by weight of residual methylene chloride.

In the final drying procedures, the drying temperature was controlled in response to the residual solvent content and the Tg' of the film as follows.

| Drying section | Tg' (°C.) | Residual solvent (wt %) | Drying temperature (°C.) |
| --- | --- | --- | --- |
| No. 1 | 107 | 12.2 | 100 |
| No. 2 | 118 | 9.5 | 115 |
| No. 3 | 135 | 6.0 | 125 |
| No. 4 | 155 | 3.0 | 140 |
| No. 5 | 175 | 1.0 | 155 |
| No. 6 (cooling) | — | — | 40 |

In section No. 6, the finally dried film was cooled at 40° C. The resultant cooled film had a residual solvent content of 0.1%, a thickness of 75.0±0.5 μm, a Re value of 7.3±0.5 nm and a Q value of 68.7±3.2 nm. Namely, although the resultant cellulose triacetate film had a high uniformity in thickness and Re value in the film surface plane, the Q value of the film was very high.

Example 15

The same procedures as in Example 14 were carried out with the following exceptions.

In the final drying procedure for the residual solvent-containing cellulose triacetate film removed from the film-forming belt surface, the drying temperature was controlled as follows.

| Drying section | Tg' (°C.) | Residual solvent (wt %) | Drying temperature (°C.) |
| --- | --- | --- | --- |
| No. 1 | 100 | 14.3 | 135 |
| No. 2 | 123 | 9.0 | 150 |
| No. 3 | 148 | 4.0 | 170 |
| No. 4 | 170 | 1.5 | 170 |
| No. 5 | 178 | 0.5 | 150 |
| No. 6 (cooling) | — | — | 40 |

The resultant cellulose triacetate film had a residual solvent content of 0.1% by weight, a thickness of 74.0±2.5 μm, an Re value of 12.0±3.8 nm and a Q value of 31.0±6.2 nm.

Example 16

The same continuous film-forming procedures as in Example 14 were carried out with the following exceptions.

The cellulose diacetate dope solution prepared in Referential Example 4 and containing 15% by weight of cellulose diacetate dissolved in 1,3-dioxolane was used in place of the cellulose triacetate dope solution.

In the initial drying procedure, the drying temperatures in the initial three sections were successively raised to 70° C., to 80° C. and then to 90° C., and thereafter, the film was cooled to 70° C. in the final section. The resultant initially dried film contained 14.5% by weight of 1,3-dioxolane. The film was removed from the film-forming belt surface and fed into a final drying procedure. In the final drying procedure, the drying temperature was controlled as follows.

| Drying section | Tg' (°C.) | Residual solvent (wt %) | Drying temperature (°C.) |
| --- | --- | --- | --- |
| No. 1 | 120 | 14.3 | 120 |
| No. 2 | 135 | 10.0 | 135 |
| No. 3 | 155 | 6.0 | 155 |

| Drying section | Tg' (°C.) | Residual solvent (wt %) | Drying temperature (°C.) |
| --- | --- | --- | --- |
| No. 4 | 170 | 3.0 | 160 |
| No. 5 | 187 | 1.0 | 165 |
| No. 6 (cooling) | — | — | 50 |

The resultant cooled cellulose diacetate had a residual solvent content of 0.2% by weight, a thickness of 75.2±0.8 μm a transmission of 91%, an Re value of 7.0±0.6 nm and a Q value of 32.0±1.3 nm. Namely, the resultant film had a high uniformity in thickness and transmission and a satisfactory optical isotropy.

Example 17

The same procedures as in Example 14 were carried out with the following exception.

As a dope solution, the cellulose triacetate dope solution prepared in Referential Example 3 and containing 15% by weight of cellulose triacetate dissolved in a mixed solvent consisting of 80 parts by weight of 1,3-dioxolane with 20 parts by weight of acetone was used.

The resultant film had a residual solvent content of 0.1% by weight, a thickness of 75.0±0.5 μm, a transmission of 91%, an Re value of 7.0±0.4 nm and a Q value of 33.0±1.0 nm.

The resultant film had a satisfactory uniformity in thickness and optical property and a high optical isotropy.

Example 18

The dope solution of Referential Example 5 containing cellulose triacetate and the plasticizer dissolved in 1,3-dioxolane was subjected to a continuous film-forming process as follows.

In the casting (film-forming) apparatus as in Example 14, the dope solution was extruded onto and spread on a film-forming surface of an endlessly belt circulating through an initially drying oven having four sections different in temperature from each other. The drying temperatures in the four sections were 70° C., 80° C., 90° C. and 70° C. (cooling). Namely, in the initial three sections, the drying temperature was successively raised to 70° C., 80° C. and then 90° C. and in the final section, the initially dried film was cooled to a temperature of 70° C. The resultant initially dried film contained a residual 1,3-dioxolane in a content of 14.5% by weight. The film was removed from the belt surface and then subjected to a final drying procedure using a drying oven having 6 drying sections in which the film could shrink in the transversal direction thereof and the drying temperature was controlled in response to the Tg' of the residual solvent-containing film as follows.

| Drying section | Tg' (°C.) | Residual solvent (wt %) | Drying temperature (°C.) |
| --- | --- | --- | --- |
| No. 1 | 84 | 14.3 | 90 |
| No. 2 | 98 | 10.0 | 105 |
| No. 3 | 120 | 4.9 | 120 |
| No. 4 | 131 | 2.5 | 135 |
| No. 5 | 143 | 1.0 | 145 |
| No. 6 | — | — | 40 |

In the section Nos. 1 to 5, the drying temperature was successively raised in response to the measured values of Tg' and residual solvent content, in accordance with the relationship (I), and in section No. 6, the dried film was cooled.

The resultant cooled film had a residual solvent content of 0.2% by weight, a thickness of 76.0±0.5 μm, and a Re value of 6.5±0.5 nm. Namely, it was confirmed that the resultant film was uniform in qualities (optical properties, thickness, etc.) thereof, and exhibited a very low anisotropy.

Also, the Q value $(Q=|(n_x+n_y)/2-n_z|\times d\times 10^3)$ of the film was 32±1.0 nm.

Example 19

The same dope solution as in Example 14 containing 15% by weight of cellulose triacetate dissolved in 1,3-dioxolane was subjected to a continuous film-forming process as follows.

In a comma coat-casting (film-forming) apparatus, the dope solution was coated onto and spread on a film-forming surface of a polyester film support, and the spread dope solution was introduced into an initial drying oven having three sections different in temperature from each other, and filled with a nitrogen gas. The drying temperatures in the three sections were 70° C., 80° C. and 90° C. Namely, in the initial three sections, the drying temperature was successively raised to 70° C., 80° C. and then 90° C.

At the inlets of the three sections of the initial drying oven, the concentrations of 1,3-dioxolane in the nitrogen gas atmosphere in the three sections were measured. The measured 1,3-dioxolane concentrations were 10.3%, 10.6% and 7.8% by volume. The resultant initially dried film contained a residual 1,3-dioxolane in a content of 16.2% by weight. The film was removed from the polyester film surface and then subjected to a final drying procedure using a drying oven (air atmosphere) having 6 drying sections in which the film could shrink in the transversal direction thereof and the drying temperature was controlled in response to the Tg' of the residual solvent-containing film as follows.

| Drying section | Tg' (°C.) | Residual solvent (wt %) | Drying temperature (°C.) |
| --- | --- | --- | --- |
| No. 1 | 94 | 16.0 | 100 |
| No. 2 | 117 | 9.8 | 120 |
| No. 3 | 145 | 4.5 | 140 |
| No. 4 | 165 | 2.0 | 150 |
| No. 5 | 175 | 1.0 | 160 |
| No. 6 | — | — | 40 |

In the section Nos. 1 to 5, the drying temperature was successively raised in response to the measured values of Tg' and residual solvent content, in accordance with the relationship (I), and in section No. 6, the dried film was cooled.

The resultant cooled film had a residual solvent content of 0.2% by weight, a thickness of 70.0±0.5 μm, and a Re value of 5.5±0.5 nm. Namely, it was confirmed that the resultant film was uniform in qualities (optical properties, thickness, etc.) thereof, and exhibited a very low anisotropy.

Also, the Q value $(Q=|(n_x\times n_y)/2-n_z|\times d\times 10^3)$ of the film was 33±1.0 nm.

We claim:

1. A method for producing an acylated cellulose film comprising:

dissolving an acylated cellulose in a solvent substantially free from water and consisting essentially of 60 to 100% by weight of 1,3-dioxolane and 0 to 40% by weight of another solvent in a ratio in weight of the acylated cellulose to the solvent of 10/250 to 10/15, to provide an acylated cellulose solution;

spreading the acylated cellulose solution on a film-forming surface of a support;

initially drying the spread acylated cellulose solution layer on the film-forming surface in at least one step to an extent that the content of the residual solvent remaining in the resultant initially dried acylated cellulose film is reduced to a level of 5 to 30% by weight;

removing the resultant residual solvent-containing acylated cellulose film from the film-forming surface; and finally drying the removed solvent-containing acylated cellulose film in at least one step while allowing the film to shrink in the transversal direction thereof, at a drying temperature controlled continuously or intermittently to a level satisfying the relationship (I)

$$(Tg'-50° C.) \leq T \leq (Tg'+20° C.) \quad \text{(I)}$$

wherein T represents the drying temperature in units of ° C., and Tg' represents a glass transition temperature in units of ° C. of the residual solvent-containing acylated cellulose film, the temperature Tg' being variable in response to the content of the residual solvent in the acylated cellulose film, to control an optical isotropy of the resultant acylated cellulose film to a value Q of 50 nm or less calculated in accordance with the equation (III):

$$Q=|(n_x+n_y)/2-n_z|\times d\times 10^3 \quad \text{(III)}$$

wherein $n_x$ represents a refractive index in a slow axis direction of the film surface plane, $n_y$ represents a refractive index in a fast axis direction of the film surface plane, $n_z$ represents a refractive index in the thickness direction of the film, and d represents a thickness in units of μm of the film.

2. The method as claimed in claim 1, wherein the weight ratio of the acylated cellulose to the solvent is in the range of from 10/120 to 10/20.

3. The method as claimed in claim 1, wherein the solvent consists of 1,3-dioxolane alone.

4. The method as claimed in claim 1, wherein another organic solvent material comprises at least one member selected from the group consisting of hydrocarbon compounds, ketone compounds, ester compounds, ether compounds and halogenated hydrocarbon compounds and has a boiling point of 40° C. to 160° C.

5. The method as claimed in claim 1, wherein the acylated cellulose is an acetylated cellulose.

6. The method as claimed in claim 5, wherein the acylated cellulose is a cellulose acetate having 2 to 3 acetyl groups per repeating unit thereof.

7. The method as claimed in claim 6, wherein the cellulose acetate is cellulose triacetate.

8. The method as claimed in claim 1, wherein the acylated cellulose has a reduced viscosity of from 0.3 to 10.0 dl/g determined at a concentration of 0.5 g/dl in 1,3-dioxolane at a temperature of 25° C.

9. The method as claimed in claim 1, wherein the resultant dry acylated cellulose film has a thickness of 5 to 500 μm.

10. The method as claimed an claim 1, wherein the spreading procedure of the acylated cellulose solution is carried out at a temperature of 10° to 70° C.

11. The method as claimed in claim 1, wherein the acylated cellulose solution has a viscosity of 500 to 200,000 mPa.s.

12. The method as claimed an claim 1, wherein the drying procedure is carried out in the ambient air atmosphere or in an inert gas atmosphere.

13. The method as claimed an claim 1, wherein the drying procedure on the film-forming support surface is carried out in an atmosphere consisting essentially of an inert gas and 1,3- dioxolane gas.

14. The method as claimed in claim 1, wherein the initial drying procedure on the film-forming support surface is carried out in an atmosphere consisting essentially of an inert gas and 1,3-dioxolane gas, and the final drying procedure is carried out in the ambient air atmosphere or an inert gas atmosphere.

15. The method as claimed in claim 12 or 13, wherein the inert gas comprises at least one member selected from the group consisting of nitrogen gas and carbon dioxide gas each having a content of oxygen of 10% by volume or less.

16. The method as claimed in claim 1, wherein the initial drying procedure is carried out at a temperature of from 30° C. to 130° C.

17. The method as claimed in claim 1, wherein in the final drying procedure, the drying temperature T is controlled to the range satisfying the relationship (II):

$$(Tg'-20° C.) \leq T \leq Tg' \quad \text{(II)}$$

wherein Tg' is the same as defined above.

18. The method as claimed in claim 1, wherein in the final drying procedure, the drying temperature is increased intermittently in 3 to 10 steps in response to the glass transition temperature Tg' of the solvent-containing acylated cellulose film.

19. An acylated cellulose film produced by the method as claimed in claim 1.

20. The acylated cellulose film as claimed in claim 19, having a thickness of 5 to 500 μm.

21. The method as claimed in claim 1, wherein the final drying procedure is carried out at a temperature of from 100 to 200° C. to an extent that the content of the residual solvent remaining in the resultant finally dried film is reduced to a level of 3% by weight or less.

* * * * *